(12) United States Patent
Hendershot

(10) Patent No.: US 8,763,645 B2
(45) Date of Patent: Jul. 1, 2014

(54) SUPPORT SYSTEM FOR PROCESS PIPING AND METHOD OF INSTALLATION

(76) Inventor: Christopher J. Hendershot, Akron, OH (US)

( * ) Notice: Subject to any disclaimer, the term of this patent is extended or adjusted under 35 U.S.C. 154(b) by 231 days.

(21) Appl. No.: 13/343,749

(22) Filed: Jan. 5, 2012

(65) Prior Publication Data

US 2013/0174931 A1 Jul. 11, 2013

(51) Int. Cl.
*F16L 3/00* (2006.01)
*E21F 17/02* (2006.01)

(52) U.S. Cl.
USPC ............ 138/107; 138/106; 138/108; 248/62; 248/59

(58) Field of Classification Search
USPC ............ 138/106–108, 110, 112, 113; 248/62, 248/49, 58, 59, 317, 74.1, 74.4
See application file for complete search history.

(56) References Cited

U.S. PATENT DOCUMENTS

| 3,122,346 | A | * | 2/1964 | Seller | 248/62 |
| 3,387,809 | A | * | 6/1968 | Zwerling | 248/58 |
| 3,539,137 | A | * | 11/1970 | March | 248/62 |
| 3,653,618 | A | * | 4/1972 | Kindorf et al. | 248/58 |
| 4,240,602 | A | * | 12/1980 | McDonald | 248/58 |
| 7,195,038 | B2 | * | 3/2007 | Friedline et al. | 138/106 |

* cited by examiner

*Primary Examiner* — Patrick F Brinson
(74) *Attorney, Agent, or Firm* — Renner, Kenner, Greive, Bobak, Taylor & Weber Co., L.P.A.

(57) ABSTRACT

A support system for process piping and method of installation are presented. An adjustable hanger rod assembly includes a rod with oppositely oriented external threads at opposite ends thereof. These threads are adapted to mate with internal threads in respectively associated sleeves. One of the sleeves is fixed to a support system, while the other sleeve is fixedly secured to a pipe clamp. The oppositely oriented threading of the rod allows the rod to operate as a turnbuckle, such that rotation of the rod adjusts the elevation of the pipe clamp and an associated pipe retained thereby. Once a desired adjustment has been achieved, the rod and associated pipe clamp may be locked into position by tack or spot welding of the rod to the associated sleeves.

12 Claims, 1 Drawing Sheet

SUPPORT SYSTEM FOR PROCESS PIPING AND METHOD OF INSTALLATION

TECHNICAL FIELD

The invention herein resides in the art of industrial piping systems, and more particularly, to such systems that are used for transporting fluid from one work station to another in a manufacturing process. Specifically, the invention relates to a support system for piping in a fluid manufacturing process, and particularly, the suspension or support apparatus, system installation, and the method of effecting the same. Most particularly, the invention relates to adjustable pipe hangers that may be secured to an overhead surface such as the ceiling, wall, floor or the like and which may be adjusted in situ to achieve a desired elevation or slope for the suspended pipe.

BACKGROUND ART

With reference to FIG. 1, an appreciation can be obtained with regard to the process piping systems of the prior art, for a general understanding of the basis for the improvement of the present invention. As shown in FIG. 1, a process piping system of the prior art is designated generally by the numeral 10. Piping systems of this nature are commonly used in many manufacturing facilities, such as in the pharmaceutical industry. In such systems, a transport pipe 12 is suspended from an overhead ceiling 14 or other support surface by a plurality of hangers 16. According to the prior art, a typical hanger 16 comprises a metal rod 18 with a pipe clamp 20 secured to one end thereof and a mounting plate 22 secured to the other. Typically, the pipe 18 is welded to the clamp 20 and plate 22, the latter of which is secured to the ceiling 14 or other structure, such as a joist, truss, or the I-beam 24, as by weldments or the like. While the prior art and the invention herein are described with respect to a piping system suspended from overhead, such as by attachment to a ceiling, joists, trusses, beams and the like, it will be apparent that both the prior art and the invention herein are conducive to attachment to walls, floors and generally any stationary member.

As shown in FIG. 1, the pipe 12 extends between a first processing station 26 and a second processing station 28, the former having an inlet pipe 30 and the latter, an outlet pipe 32. The pipes 30, 32 would typically also be supported by hangers 16. It will be appreciated by those skilled in the art that the pipe 12 typically has a slope or grade associated therewith, such that the elevation of the pipe descends along the processing line from the beginning to the end. Accordingly, a good portion of the movement of the fluid being processed is by the force of gravity. As a consequence, the lengths of the rods 18 necessarily differ to accommodate the desired slope or grade of the pipe 12, taking into account variations in the elevation of the supporting surface 14 and support members such as the I-beam 24.

Installation of the system 10 in the prior art was a costly and time consuming operation. It was generally a two step process, the first of which was the installation of a mock system of pipe support hangers, from which the lengths of the various hangers could be determined in order to achieve the desired elevations and slopes in the final installation. Accordingly, the work process was substantially doubled, the first half being the installation of the mock system and its associated hangers, often laid up with laser levels and the like. This mock installation would then be removed and replaced with a final installation where the hangers 16 had been cut to appropriate lengths and welded together for installation along the ceiling 14 and support members 24. Oftentimes, the installation of the mock system to take the necessary measurements for the in situ manufacture of the hangers 16 was the largest portion of time and effort consumed in the installation.

There is a need in the art of processed piping for a more cost effective system and method of installation than that presently being practiced. Indeed, there is a need in the art for an improved hanger which allows for adjustability in situ, obviating the need for a mock installation.

DISCLOSURE OF INVENTION

In light of the foregoing, it is a first aspect of the invention to provide a support system for piping and method of installation which substantially eliminates the need for a temporary or mock layout of the piping system.

Another aspect of the invention is the provision of a support system for piping and method of installation which provides for in situ adaptability of support rods and hangers to effect proper positioning of the pipe.

Yet another aspect of the invention is the provision of a support system for piping and method of installation in which adjustable rods allow for both the initial installation of the pipe and fine tuning of its elevation and slope to ensure appropriate positioning and slopes throughout the piping system.

Still a further aspect of the invention is the provision of a support system for piping and method of installation wherein the support rods are threaded at each end and are of varying lengths and are adapted for receipt by threaded sleeves, one sleeve secured to a fixed structure such as a ceiling, and the other to a pipe receiving clamp.

Still a further aspect of the invention is the provision of a support system for piping and method of installation wherein the same hangers are used for initial installation and final installation, such that the adjustable rods, when adjusted to their final position, can be secured by weldments or the like, preventing any further adjustability or change.

Yet another aspect of the invention is the provision of a support system for piping and method of installation which is highly cost effective in manufacture and implementation, and is extremely reliable in use.

The foregoing and other aspects of the invention that will become apparent as the detailed description proceeds are achieved by a pipe hanger, comprising: a rod having first and second ends; a first sleeve adapted for connection to said first end of said rod; a second sleeve adapted for connection to said second end of said rod; a pipe receiver connected to said second sleeve; and wherein at least one of said first and second sleeves is adapted for adjustable connection to a respective one of said first and second ends, whereby an effective length of said rod between said first and second sleeves may be adjusted.

Other aspects of the invention that will become apparent as the detailed description proceeds are achieved by a piping system, comprising: a length of pipe extending along a distance; a plurality of hangers suspended from a support surface and receiving and maintaining said length of pipe at set elevations therealong, each of said plurality of hangers comprising: a rod of adjustable length operatively extending between said support surface and said pipe, and elevation of said pipe for each said hanger being set by adjustment of said adjustable length of said rod; and wherein adjustability of said length of said rod is terminable.

Yet further aspects of the invention that will become apparent herein are achieved by a method for installing a piping system, comprising: securely attaching a plurality of pipe hangers from a support surface, each said hanger having a length; engaging said hangers with a pipe; adjusting an effective length of each of said plurality of hangers to set a desired elevation of said pipe at each said hanger; and fixing said length of each of said plurality of hangers when said elevations are set.

DESCRIPTION OF DRAWINGS

For a complete understanding of the various aspects of the invention, reference should be made to the following detailed description and accompanying drawings wherein.

DETAILED DESCRIPTION OF PREFERRED EMBODIMENT

The present invention contemplates the use of hangers employing adjustable threaded rods of varying lengths to both temporarily set the pipe and then permanently maintain it. In accordance with the use of the adjustable hangers of the instant invention, the layout of the installation and the final assembly are substantially joined together in a single step, reducing the time, materials, and incident costs for such installations.

Figure 2:
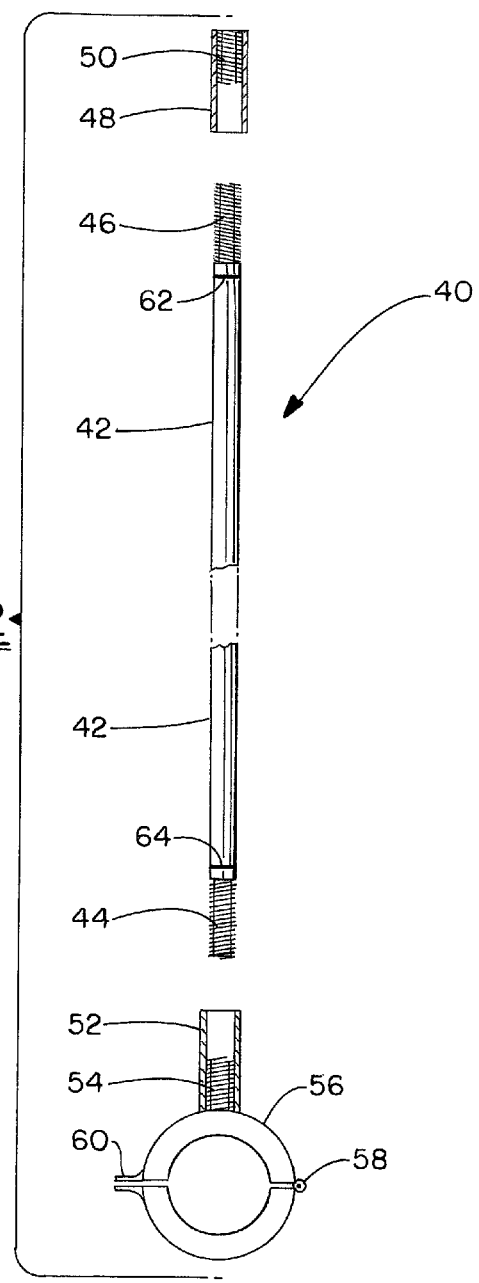
FIG. 2 is an assembly diagram of the adjustable hanger rod assembly of the invention.

With continued reference to the drawings and particularly FIG. 2, it can be seen that an adjustable hanger rod assembly of the instant invention is designated generally by the numeral 40. The adjustable hanger rod assembly 40 includes a rod 42 having opposite threaded ends 44, 46, each end being threaded in a direction or orientation opposite that of the other. For example, the end 44 may have a right hand or clockwise thread, while the end 46 has a left hand or counterclockwise thread. Under the concepts of the invention, it will be appreciated that the threading of the ends may be interchanged. A sleeve 48 is provided in association with the end 46, the sleeve 48 having internal threads 50 adapted to mate with the external threads 46 of the rod 42. Similarly, a sleeve 52 is provided in association with the end 44, having internal threads 54 adapted to mate with the external threads 44. It will be appreciated that the threads 50, 54 of the respective sleeves 48, 52 extend only a portion of the length of the sleeve, and are presented in the distal end of the sleeve such that initial insertion of the threaded ends 44, 46 of the rod 42 into the sleeve is into an unthreaded portion. According to a preferred embodiment, the sleeve will have a length of 2-3 inches, and preferably on the order of approximately 2.5 inches, with the threaded length being on the order of 1.75 inches, and preferably 1.5 inches. Similarly, the length of the threaded ends 44, 46 is on the order of 1-1.75 inches, and preferably approximately 1.5 inches.

A pipe clamp or receiver 56 is attached to an end of the sleeve 52 by appropriate means such as welding, or the like. This attachment is typically made during the manufacturing process, such that the combination of the sleeve 52 and attached pipe clamp 56 comprise a single unit at the point of installation. The pipe clamp 56 is provided with a hinge 58 allowing it to open such that it can receive a pipe of appropriate diameter, in standard fashion. The clamp may then be closed upon the pipe and sealed closed as by any appropriate fastener including a weldment, nut and bolt, clip, or the like at the securing flange 60.

It will be appreciated that the adjustable hanger rod assemblies 40 will necessarily be of varying lengths, to accommodate any of the wide range of installations and variations in an associated overhead support system. The threads 44, 46 and mating threads 50, 54 allow for approximately 2 inches of adjustability, according to a preferred embodiment of the invention. Accordingly, it is contemplated that the rods 42 will be provided in lengths of 2 inch increments to accommodate most conceivable installations. It is, of course, most desired that at least approximately 0.5 inch of bite be present at the interengagement of each of the associated ends 44, 46 and sleeves 48, 52. Accordingly, marks such as score lines, painted lines, or the like 62, 64 are provided in association with respective ends 46, 44 and are so positioned that the exposure of the lines 62, 64 out of the associated sleeves 50, 52 indicates that no further adjustment is available with that rod and a longer rod (typically the next longer rod) should be employed. Of course, if the rod 42 bottoms out in the sleeves 48, 52, the next shorter rod should likely be tried.

In use, the rod 42 and associated threaded sleeves 48, 52 operate as a turnbuckle, such that rotation of the rod 42 in one direction increases the effective length of the rod, while its rotation in the opposite direction shortens it. The effect is that of lowering or raising the associated pipe clamp 56 and the secured pipe 12 when employed in the installation of FIG. 1.

Figure 1:
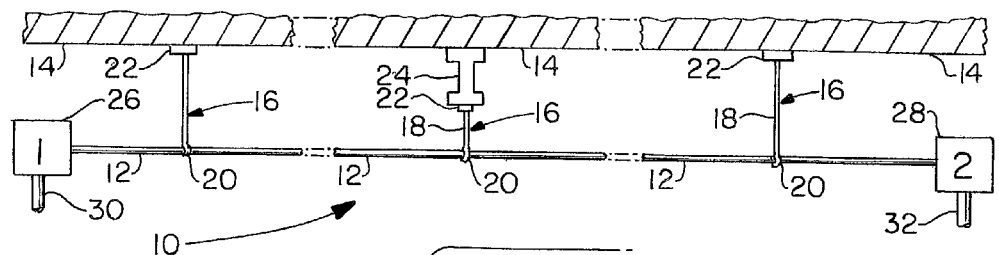
FIG. 1 is an illustration of a process piping system of the prior art, which system may be converted to the system of the invention by implementation of the hangers of the invention described herein.

An appreciation of the installation of a piping system employing the adjustable hanger rod assemblies 40 of the instant invention may be obtained with reference to FIG. 1, where the hanger rod assemblies 40 of the invention are employed to replace the hangers 16 of the prior art. The installation of the invention may commence with the attachment of sleeves 48 to associated mounting plates 22 for appropriate attachment to a ceiling 14 or other support surface, including support joists, beams, walls, floors or trusses such as the I-beam 24. With the sleeves 48 so attached to their mounting plates and secured to desired locations within and along the contemplated processing line, the rods 42 may next be secured as by threaded engagement between the external threads 46 and the internal threads 50. Next, the external threads 44 may engage the internal threads 54 and lengths of pipe 12 may then be placed within the pipe clamps 56. The clamps may then be secured closed by means of appropriate affixing at the flanges 60. Adjustment of the elevation and associated slope of the pipe 12 may then be made by rotating the associated threaded rods 42, causing associated pipe clamps 56 to raise or lower. By standard use of laser levels and the like, the elevation and grade or slope of the pipe 12 may then be appropriately adjusted. If longer or shorter rods 42 are required, the rod then in place can be threadedly removed and replaced with a rod 42 of appropriate length. During the operation, due regard is given to the marks 62, 64 to ensure that sufficient bite is maintained between rod 42 and associated sleeves 48, 52. When the grade or slope of the pipe has been set, fixing or setting of the lengths of the rods 42 may then be achieved by simple tack or spot welding of the ends of the rods 42 to their associated sleeves 48, 52. If the flanges 60 of the pipe clamps 56 have only been temporarily secured by means of a clip or the like, and permanent closure is desired, spot welding at the flanges may also be effected.

Thus it can be seen that the various aspects of the invention have been attained by the structures and methods presented and described above. While in accordance with the patent statutes, only the best mode and preferred embodiment of the invention has been presented and described in detail, the invention is not limited thereto or thereby. Accordingly, for an appreciation of the true scope of the invention, reference should be made to the following claims.

What is claimed is:

1. A pipe hanger comprising:
    a rod having first and second ends;
    a first sleeve adapted for connection to said first end of said rod;
    a second sleeve adapted for connection to said second end of said rod;
    a pipe receiver connected to said second sleeve;
    wherein at least one of said first and second sleeves is adapted for adjustable connection to a respective one of said first and second ends, whereby an effective length of said rod between said first and second sleeves may be adjusted;
    wherein said at least one of said first and second sleeves has an internal thread, and said respective one of said first and second ends has an external thread adapted for mating engagement with said internal thread; and
    wherein both said first and second sleeves have internal threads and said first and second ends have external threads, said threads of each of said sleeves and said associated ends being adapted for mating engagement, said threads of one of said sleeves being a right-handed thread, and said threads of another of said sleeves being a left-handed thread.

2. The pipe hanger according to claim 1, wherein said rod bears at least one mark in association with one of said sleeves, said mark indicating an amount of extension of said rod from said sleeve.

3. The pipe hanger according to claim 1, wherein said pipe receiver comprises a hinged clamp having an aperture for receiving and maintaining a pipe.

4. The pipe hanger according to claim 1, wherein said internal threads of said first and second sleeves are in first end portions of said sleeves, second end portions of said sleeves being unthreaded.

5. A piping system comprising:
    a length of pipe extending along a distance;
    a plurality of hangers suspended from a support surface and receiving and maintaining said length of pipe at set elevations therealong, each of said plurality of hangers comprising:
    a rod of adjustable length operatively extending between said support surface and said pipe, and elevation of said pipe for each said hanger being set by adjustment of said adjustable length of said rod;
    wherein adjustability of said length of said rod is terminable;
    wherein said rod is rotatably maintained at each end thereof;
    wherein at least one end of said rod is threadedly adjustable; and
    wherein each end of said rod is threaded, a first end having right-hand threads thereon, and a second end having left-hand threads thereon.

6. The piping system according to claim 5, wherein each said end is in threaded engagement with mating internal threads of respectively associated first and second sleeves.

7. The piping system according to claim 6, wherein said first sleeve is fixed to said support surface and said second sleeve is fixed to a retainer receiving said pipe.

8. The piping system according to claim 7, wherein said adjustability is terminable by weldments between said first and second sleeves and said rod.

9. A method for installing a suspended piping system, comprising:
    securely attaching a plurality of pipe hangers from a support surface, each said hanger having a length;
    engaging said hangers with a pipe;
    adjusting an effective length of each of said plurality of hangers to set a desired elevation of said pipe at each said hanger;
    fixing said length of each of said plurality of hangers when said elevations are set;
    wherein said step of adjusting said effective length comprises rotating a rod of said hanger about a longitudinal axis of said rod;
    wherein said step of rotating said rod causes said effective length of said rod to shorten or lengthen as a function of a direction of said rotation;
    wherein said step of engaging said hangers with a pipe comprises the step of closing a clamp at a first end of said rod about said pipe; and
    wherein said step of securely suspending comprises attaching of a first threaded sleeve to said support surface, and wherein a second threaded sleeve is attached to said clamp, said rod being threadedly engaged to both said first and second sleeves, and wherein said step of fixing said length of each of said plurality of hangers comprises welding said rod to said first and second sleeves.

10. The method for installing a suspended piping system according to claim 9, further comprising a step of monitoring said rod during said step of rotating said rod, and replacing said rod with a rod of a different length upon exposure of a mark on said rod.

11. The method for installing a suspended piping system according to claim 9, wherein said step of fixing said length of said hanger comprises placing of a weldment upon said rod.

12. A pipe hanger comprising:
    a rod having first and second ends;
    a first sleeve adapted for retaining engagement with said first end of said rod;
    a second sleeve adapted for retaining engagement with said second end of said rod;
    a pipe receiver connected to said second sleeve; and
    wherein at least one of said first and second ends of said rod is adapted to be rotatable within and contained by the respective first and second sleeve for length-adjustable connection and wherein said first end of said rod and said first sleeve are adapted for a first threaded engagement and said second end of said rod and said second sleeve are adapted for a second threaded engagement, said first and second threaded engagements being oppositely threaded.

* * * * *